UNITED STATES PATENT OFFICE.

ADOLF KAUFMANN, OF GENEVA, SWITZERLAND.

PROCESS FOR PRODUCING 4-KETONES OF THE QUINOLIN SERIES.

1,145,487.     Specification of Letters Patent.     Patented July 6, 1915.

No Drawing.     Application filed May 1, 1913. Serial No. 764,952.

*To all whom it may concern:*

Be it known that I, Dr. ADOLF KAUFMANN, a citizen of Switzerland, residing at 5 Place Clafarède, Geneva, Switzerland, have invented certain new and useful Improvements in Process for Producing 4-Ketones of the Quinolin Series, of which the following is a specification.

I have found that by treating a 4-cyanquinolin with a Grignard's solution and subsequently decomposing the resulting addition products by means of water, the hitherto unknown monoketones are obtained which have the general constitutional formula:

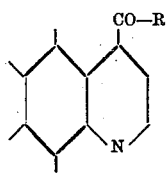

wherein "R" stands for a hydrocarbon residue. The new monoketones are oils or substances of a low melting point, which are very slightly volatile in steam. They are characterized as ketones by the fact that they form well crystallizing hydrazones, dissolving in acids with a characteristic orange-red color. These ketones are intended to be used as starting substances for manufacturing therapeutically valuable products.

The following examples will illustrate my invention, the parts being by weight:

Example I: One part of 4-cyanquinolin (see *Berichte* vol. 44, 1911, page 2062) is dissolved in benzene, and to this are then carefully added, while stirring, two parts of methyl magnesium iodid, after which the mixture is kept boiling on a reflux condenser on the water bath for half an hour. The solid granular precipitate thus obtained is then treated with ice water and ammonium chlorid and the ketone produced is separated by the aid of benzene. From the benzene-extract gaseous, dry hydrochloric acid will precipitate the hydrochlorid of the new ketone in the form of a white crystalline powder. The quinolyl-4-methylketone separated from the salt as an oil is dried and subjected to a distilling process, preferably at a greatly reduced pressure. It boils at a pressure of 0.2 mm. at about 106° C. (not corrected) and melts below 20° C.; it is very slightly volatile in steam, and is soluble in organic solvents. The picrate of the ketone forms bundles of needles which decompose when heated to 165–170° C. The hydrochlorid forms colorless prisms from alcohol and decomposes at 200–215° C. The iodo-methylate forms dark red crystals melting at 172° C.; the hydrazone produced with phenylhydrazin forms a yellowish powder.

Example II: 10 grams of 4-cyanquinolin dissolved in ether or equivalent solvent are gradually treated with a solution of 23.6 grams of a phenyl-magnesium-bromid in ether-solution, and after heating for one hour on a water-bath, the liquid is decomposed with ice-water and ammonia chlorid. The ether and benzene are then driven off by means of steam, and the distillation is continued until no more diphenyl passes over, the viscid, sticky mass in the distilling vessel is mixed with ether, the solution dried with sodium sulfate, and thereupon the hydrochlorid of the ketone is precipitated by dry hydrochloric acid. By crystallization from alcohol or water the hydrochlorid is recovered in the form of white flakes, melting at 204° C. The quinolyl-4-phenylketone separated from the salt distils without decomposition at a pressure of about 0.12 mm. at 145° C. It is very readily soluble in alcohol, ether and benzene. The picrate forms brownish-yellow flakes melting at 214° C.; the phenyl-hydrazone a yellow crystalline powder melting at 239–240° C.

Example III: Two and one-half parts of methyl magnesium iodid dissolved in ether are added to one part of 6-methyl-4-cyanquinolin (see *Berichte*, vol. 45, p. 1807), which is held in solution in hot anisol. A yellowish precipitate is formed, and after boiling for a short time it is decomposed with water, ammonium chlorid added, and the unchanged anisol driven off with steam. A viscid oil remains, which on cooling solidifies; it constitutes the new 6-methoxy-quinolyl-4-methyl-ketone which crystallizes from ligroin in the form of yellow needles melting at 92° C.

I claim:

1. As new products, the monoketones containing the radical linked by the atom group CO to a hydrocarbon radical, these new compounds being oils or solid compounds of a low melting point, soluble in alcohol, ether and benzene; forming crystalline salts with hydrochloric acid and picric acid and yielding with phenylhydrazin hydrazones.

2. The process of manufacturing quinolyl-4-ketones, which consists in treating 4-cyanquinolin with an alkyl-magnesium halid solution, and decomposing by means of water the addition products thus obtained.

3. The process of manufacturing 6-alkyloxyquinolyl-4-methylketones, which consists in treating 6-alkyloxy-4-cyanquinolin with magnesium-methyliodid and decomposing by means of water the addition products thus obtained.

4. The process of manufacturing 6-methyloxyquinolyl-4-methylketone, which consists in treating 6-methoxy-4-cyanquinolin with magnesium-methyl-iodid, and decomposing by means of water the addition product thus obtained.

In testimony whereof I affix my signature in presence of two witnesses.

Dr. ADOLF KAUFMANN

Witnesses:
 FRANCIS B. KEENE,
 LOUIS H. MUNICRY.